(12) United States Patent
Engelhart

(10) Patent No.: US 12,003,599 B2
(45) Date of Patent: *Jun. 4, 2024

(54) EVENT MANAGEMENT MECHANISM IN 5G SYSTEMS AND METHODS

(71) Applicant: T-Mobile USA, Inc., Bellevue, WA (US)

(72) Inventor: Robert Engelhart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/560,556

(22) Filed: Dec. 23, 2021

(65) Prior Publication Data

US 2022/0116469 A1    Apr. 14, 2022

Related U.S. Application Data

(63) Continuation of application No. 17/011,904, filed on Sep. 3, 2020, now Pat. No. 11,252,246.

(60) Provisional application No. 62/895,460, filed on Sep. 3, 2019.

(51) Int. Cl.
*H04L 67/55* (2022.01)
*H04W 4/029* (2018.01)
*H04W 76/19* (2018.01)

(52) U.S. Cl.
CPC ............. *H04L 67/55* (2022.05); *H04W 4/029* (2018.02); *H04W 76/19* (2018.02)

(58) Field of Classification Search
CPC .... H04M 15/85; H04M 15/725; H04M 15/41; H04M 15/73; H04M 15/74; H04M 15/70; H04M 15/8228; H04M 15/853; H04W 4/24; H04W 76/19; H04W 4/029; H04L 67/55; H04L 12/1407
See application file for complete search history.

(56) References Cited

U.S. PATENT DOCUMENTS

| | | |
|---|---|---|
| 9,900,444 B1 | 2/2018 | Seetharaman et al. |
| 10,531,515 B1 | 1/2020 | Engelhart |
| 10,673,618 B2 | 6/2020 | Suthar et al. |
| 10,791,044 B1 * | 9/2020 | Krishan .................. H04L 43/50 |
| 11,252,246 B1 | 2/2022 | Engelhart |
| 11,265,753 B2 * | 3/2022 | Dasgupta .......... H04W 28/0257 |
| 2013/0171975 A1 | 7/2013 | Lindner et al. |
| 2016/0099791 A1 * | 4/2016 | Cui ........................ H04B 7/024 370/329 |
| 2017/0134906 A1 * | 5/2017 | Yoo ......................... H04W 8/22 |
| 2018/0288622 A1 * | 10/2018 | Maria .................. H04L 63/0853 |
| 2019/0364492 A1 | 11/2019 | Azizi et al. |
| 2020/0245209 A1 * | 7/2020 | Patil ...................... H04W 76/12 |
| 2020/0389843 A1 * | 12/2020 | Huang .................... H04W 8/08 |
| 2021/0194709 A1 | 6/2021 | Yadav et al. |
| 2021/0306842 A1 * | 9/2021 | Rivas Molina ......... H04L 67/51 |
| 2021/0314446 A1 * | 10/2021 | Gardella ........... H04M 15/8228 |
| 2021/0368306 A1 * | 11/2021 | Garcia Azorero .... H04M 15/66 |
| 2022/0232369 A1 * | 7/2022 | Puente Pestaña ....... H04L 67/14 |

* cited by examiner

*Primary Examiner* — Congvan Tran
(74) *Attorney, Agent, or Firm* — Perkins Coie LLP

(57) ABSTRACT

Systems and methods for dynamically collecting information regarding network events in a 5G network are disclosed. The method includes locally storing event data initially and implementing post-event collection of the locally stored data when one or more collecting nodes become available.

20 Claims, 5 Drawing Sheets

//EVENT MANAGEMENT MECHANISM IN 5G SYSTEMS AND METHODS

CROSS-REFERENCE TO RELATED APPLICATIONS

This application is a continuation of U.S. patent application Ser. No. 17/011,904, filed Sep. 3, 2020, entitled EVENT MANAGEMENT MECHANISM IN 5G SYSTEMS AND METHODS, which claims the benefit of U.S. Provisional Patent Application No. 62/895,460, filed Sep. 3, 2019, entitled EVENT MANAGEMENT MECHANISM IN 5G SYSTEMS AND METHODS, which are hereby incorporated by reference in its entirety.

BACKGROUND 5G is the Fifth-Generation cellular network technology that targets improvements over previous cellular network technologies, such as 4G Long Term Evolution (LTE). Compared to the previous technologies, the 5G systems and standards target lower latency based on changes to both physical transmission of signals (based on e.g., communicating signals in higher frequency bands) and to network architecture. While standards (e.g., the Third Generation Partnership Project (3GPP) standards) govern some aspects of 5G network technology, many aspects of communication devices and systems, including implementation details, remain unaddressed by the standards.

Figure 1:
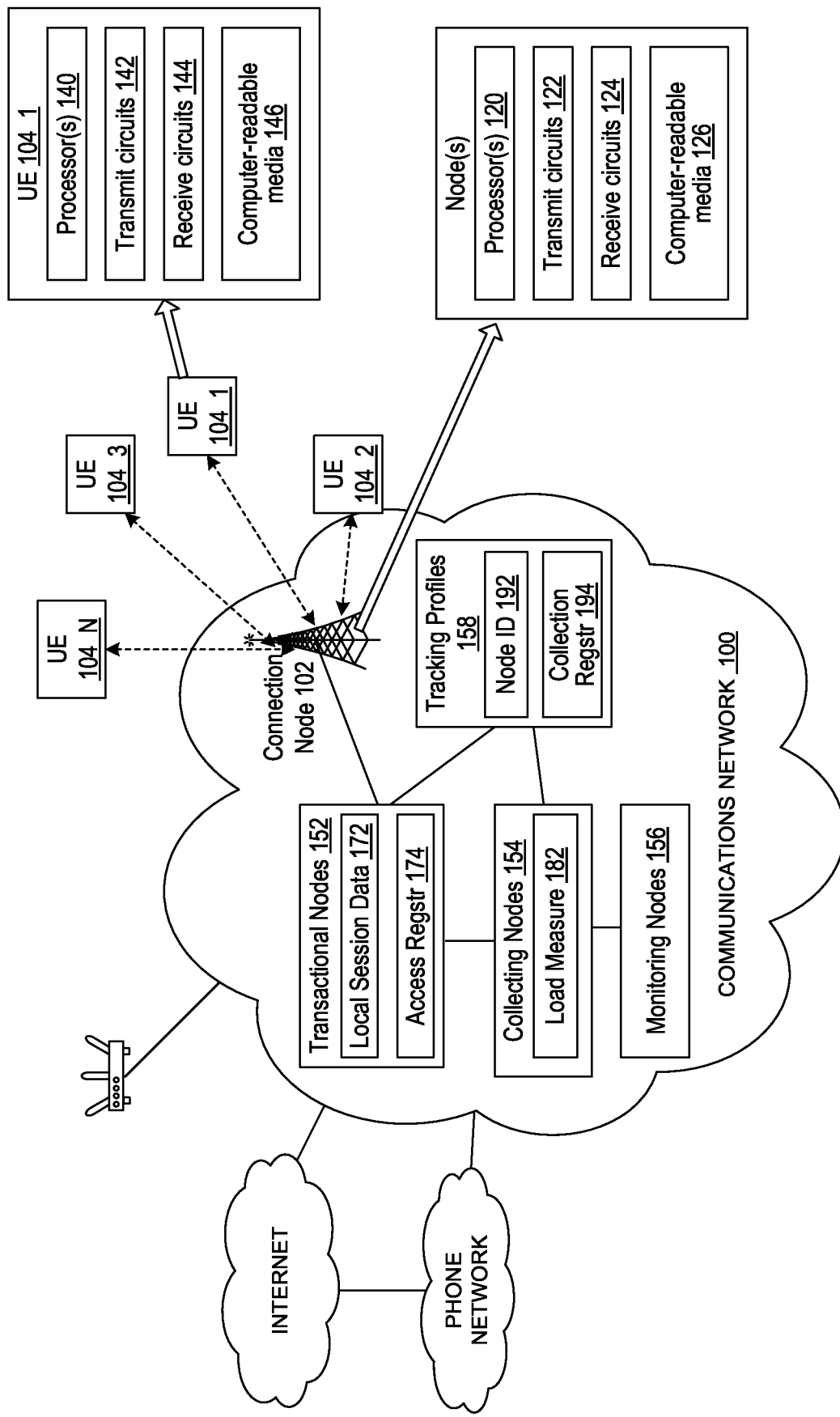
FIG. 1 illustrates a communication network in which some implementations of the present technology can be utilized.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

For 5G networks, various functionalities (e.g., security, dynamic resource allocations, address allocations, filtering, billing, etc.) are provided via network functions (NFs). According to 3GPP standards, the NF includes standard-adopted or standard-defined processing functions in a network, which have defined functional behavior and interfaces. The NF can be implemented either as a network element on dedicated hardware, as a software instance running on a dedicated hardware, or as a virtualized function instantiated on an appropriate platform (e.g. a cloud infrastructure). Some examples of NFs include an Authentication Server Function (AUSF), an Access and Mobility Management Function (AMF), a User Equipment (UE), a Session Management Function (SMF), and a Network Repository Function (NRF).

Additionally, the NFs can include a Charging Function (CHF) that supports billing. The CHF can provide functionalities associated with online and/or offline charging, quota management (e.g., for delivering/granting a specific number of units, such as bytes or seconds), and/or interactions with other billing systems. For example, the CHF can collect, provide, and/or process call detail records (CDRs) that describe (via, e.g., metadata) specific instances of telecommunication transactions/events. The CHF can represent a service provider to the network.

In one or more implementations of the present invention, a communications network and system can provide dynamic management of virtualized nodes (e.g., the NFs, such as the CHFs), such as by coordinating the activities for a set of the virtualized nodes. The network (e.g., the virtualized nodes and/or other components) can be configured to collect information regarding telecommunication transactions (e.g., session data regarding charging events) during and/or after such transactions/events. For example, one or more transactional nodes (e.g., a set of the NFs, such as the UE, the SMF, etc.) can establish and conduct a telecommunication transaction that exchanges content or payload data, such as voice signals, streaming data, etc. The network can include collecting nodes (e.g., a different set of the NFs, such as the CHF) configured to collect and/or process information (e.g., CDRs) regarding the transaction.

The network and/or one or more of the components therein can be configured to collect and/or process the information dynamically during and/or after conclusion of the transaction. In some implementations, the transactional nodes can be configured to locally store the session data and notify one or more network components of the local storage for subsequent collection. For example, the network can use one or more tracking profiles at one or more predetermined or configurable components or virtualized nodes to track the transactional nodes having session data that need to be collected. The network can further include monitoring nodes (e.g., the collecting nodes and/or the service orchestrators) that can be configured to monitor tasks/loads associated with the collecting nodes. When the monitored load is below a threshold, the network can use the corresponding collecting nodes to identify the transactional nodes (via, e.g., the tracking profiles) having the session data locally stored therein and transfer the session data to the collecting nodes.

As an illustrative example, the transactional nodes (e.g., the NFs) can be configured to detect events or conditions (e.g., network interruptions and/or unavailable CHFs) that prohibit or degrade the transactional nodes from successfully communicating the charging events and/or the corresponding session data. Based on the detections, the transactional nodes can be configured to locally store predetermined or configurable types of information (e.g., session details and/or metadata) regarding ongoing or finished communication sessions. The transactional nodes can further store their identifiers and/or addresses at one or more predetermined or configurable locations (e.g., at one or more predetermined or dynamically determined instances of databases, Domain Name Systems (DNSs), a specific set of NFs, or a combination thereof) based on the detection. When the processing loads (e.g., number scheduled tasks, processed data, and/or a number of transactions for a unit of time) of the collecting nodes (e.g., the CHF) fall below a threshold, the network can utilize the corresponding collecting nodes to obtain the locally stored information.

In the following description, for the purposes of explanation, numerous specific details are set forth in order to provide a thorough understanding of implementations of the present technology. It will be apparent, however, to one skilled in the art that implementations of the present technology can be practiced without some of these specific details. Further, while the following description discusses voice communication (for example, VoLTE, VoNR, and so on), it will be apparent to one skilled in the art that implementations of the present technology can be practiced for other types of communications as well (for example, video, text, and so on).

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

FIG. 1 illustrates a communications network 100 (also referred to herein as network 100) in accordance with various implementations. The network 100 can include a connection node 102 (e.g., a base station (BS)) communicatively coupled to one or more user equipment (UE), such as UEs 104_1-104_N. The connection node 102 can serve UEs 104 located within a geographical area, for example, within a macro cell. The connection node 102 can be configured to connect the served UEs 104 to a larger network (e.g., the Internet, the telephone network, etc.), such as for communicating voice traffic and/or data traffic to and/or from the connected UEs 104. The connection node 102 can include a RAN Node such as an Evolved-Universal Terrestrial Radio Access Network (E-UTRAN) Node B (also commonly denoted an eNode B, or eNB) and/or RNC in an E-UTRAN. The connection node 102 can include a next generation Node B (gNB).

The connection node 102 can communicate with the UEs 104 using one or more communication protocols or standards. Some examples of the communication protocols or standards can include: Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (e.g., IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (e.g., IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), and/or other communications networks.

The connection node 102 can be communicatively coupled (for example, using a backhaul connection) to backhaul equipment, for example, an operation support subsystem (OSS) server, a radio network controller (RNC), etc. The RNC can also be in the form of or include a mobility management entity (MME) and/or an access and management mobility function (AMF). The network 100 and/or one or more of the connection nodes 102 therein can further be communicatively coupled to other networks or components therein. For example, the network 100 can be communicatively coupled to and/or include components (e.g., servers, switches, etc.) of the Internet and/or the telephone network.

The network 100 can further include one or more virtualized nodes that are implemented by one or more circuit components. The virtualized nodes can be implemented via a distributed computing environment and/or a cloud-computing environment. Some examples of the virtualized nodes for the network 100 can include NFs and/or tracking lists.

As an illustrative example, the network 100 can view and process one or more functionalities or actions of the connection node 102 and/or the UEs 104 as virtualized nodes. Also, the network 100 can further include transactional nodes 152, collecting nodes 154, monitoring nodes 156, and/or tracking profiles 158. The transactional nodes 152 can include the NFs (e.g., the virtualized UEs, the SMFs, etc.) associated with specific transactions, such as communication sessions for transferring payload/content data to and/or from the UEs 104 and/or billable data transfers. The collecting nodes 154 can include the NFs (e.g., the CHFs) configured to track, collect, and/or otherwise process information associated with the specific transactions, such as for billing services. The monitoring nodes 156 can include the NFs (e.g., other NFs, designated CHFs, and/or the CHFs for self-monitoring) and/or the network components (e.g., service orchestrators) configured to monitor and/or control the activities of the collecting nodes 154.

The tracking profiles 158 can include information stored at a predetermined and/or dynamically configured set of virtualized nodes and/or network components that identify the transactional nodes 152 having locally stored information that needs to be collected by the collecting nodes 154. The tracking profiles 158 can be centralized in some common environment/location (e.g., a centralized database). The tracking profiles 158 can be a static configuration on each of the collecting nodes 154, or can be maintained dynamically such that the transactional nodes 152 and/or the collecting nodes 154 have read/write access thereto.

As an illustrative example, the transactional nodes 152 can be configured to locally store local session data 172

(e.g., description of one or more communication sessions) during and/or after the communication sessions, such as when the collecting nodes 154 are momentarily unavailable or due to other network conditions. Upon storing the local session data 172, the transactional nodes 152 can be registered on the tracking profiles 158. For example, the transactional nodes 152 can communicate with a network component and/or a centralized database, which are configured to update the tracking profiles 158 to include node identifiers 192 (e.g., node names and/or addresses) corresponding to the transactional nodes 152. Accordingly, the tracking profiles 158 can include one or more listings of the transactional nodes 152 having the local session data 172 that need to be collected.

As a separate process, the monitoring nodes 156 can track load measures 182 (e.g., amounts of scheduled tasks and/or tasks performed per a unit of time, such as idle capacity) of the collecting nodes 154 in real-time. When the load measures 182 fall below a predetermined or a configurable threshold (e.g., a percentage of full processing capacity of the collecting nodes 154), the corresponding collecting nodes 154 can access the tracking profiles 158 to identify one or more of the transactional nodes 152 having the local session data 172. Accordingly, the collecting nodes 154 can select one or more of the transactional nodes 152 via the tracking profiles 158 and obtain the local session data 172 from the identified transactional nodes 152. The tracking profiles 158 can track the transactional nodes 152 based on a first-come-first-served scheme, and the collecting nodes 154 can select the transactional nodes 152 from the tracking profiles 158 based on the first-come-first-served scheme.

The tracking profiles 158 can include a collection registration mechanism 194 that represents and tracks assignment of one or more collecting nodes 154 for each of the node identifiers 192. For example, the collection registration mechanism 194 can generate a status indicator for a node identifier when one or more of the collecting nodes 154 obtain the corresponding identifier from the tracking profiles 158. Also, the collection registration mechanism 194 can remove the identifier from the tracking profiles 158 when one or more of the collecting nodes 154 obtain the corresponding identifier from the tracking profiles 158. Further, the collection registration mechanism 194 can store and track names, address, and/or other details regarding the collecting nodes 154 assigned to the node identifiers 192.

Alternatively or additionally, the transactional nodes 152 can be configured to manage transfer of the local session data 172 to the collecting nodes. For example, the transactional nodes 152 can include access registration mechanisms 174 configured to track assignment of one or more collecting nodes 154 for the local session data 172. The access registration mechanisms 174 can check out the local session data 172 (by, e.g., prohibiting access thereto by other nodes), thereby preventing other collecting nodes 154 from obtaining redundant copies of local session data 172.

As shown in the block diagram, the nodes (e.g., the connection node 102 and/or the virtualized nodes) can include or be implemented by one or more processors 120, one or more transmit circuits (transmitters) 122, one or more receive circuits (receivers) 124, and/or computer-readable media 126. The processors 120 can be configured to execute instructions, which can be stored in the computer-readable media 126 or in other computer-readable media accessible to the processors 120. The processors 120 can be a central processing unit (CPU), a graphics processing unit (GPU), or both CPU and GPU, or any other sort of processing unit.

The transmitters 122 can include circuitry configured to transmit wireless and/or wire-communicated signals to external devices (e.g., the UEs 104) and/or nodes. For example, the transmitters 122 can include antennas, connectors, ports, decoders, encoders, filters, amplifiers, etc. Conversely, the receivers 124 can include circuitry configured to receive signals from external devices/nodes. For example, the receivers 124 can include antennas, connectors, ports, decoders, encoders, filters, amplifiers, etc. Alternatively or additionally, the transmitters 122 and the receivers 124 can be combined (e.g., transceivers) into a larger or an overlapping circuitry.

The computer-readable media 126 includes computer-readable storage media ("CRSM"), which can include any available physical media accessible by a computing device to implement the instructions stored thereon. For example, CRSM can include, random-access memory ("RAM"), read-only memory ("ROM"), electrically erasable programmable read-only memory ("EEPROM"), flash memory or other memory technology, compact disc read-only memory ("CD-ROM"), digital versatile discs ("DVD") or other optical disc storage, magnetic cassettes, magnetic tape, magnetic disk storage or other magnetic storage devices, or any other medium which can be used to store the desired information and which can be accessed by the processors 120. The computer-readable media 126 can reside within one or more components/devices within the network 100, on one or more storage devices accessible on a local network to the network 100, on cloud storage accessible via a wide area network to the network 100, or in any other location. The computer-readable media 126 can store modules, such as instructions, data stores, and so forth that are configured to execute on the processors 120.

The UEs 104 can include any devices for communicating over a wireless communication network. The UEs 104 can correspond to end-point devices/nodes for the communications (e.g., senders and/or receivers of voice, text, images, and/or other data). Such devices can include mobile telephones, cellular telephones, mobile computers, Personal Digital Assistants (PDAs), radio frequency devices, hand-held computers, laptop computers, tablet computers, server computers, client computers, personal computers (PCs), tablet PCs, set-top boxes ("STBs"), palmtops, pagers, Internet of Things (IoT) devices, integrated devices combining one or more of the preceding devices, or any machine capable of executing a set of instructions (sequential or otherwise) that specify actions to be taken by that machine. As such, the UEs 104 can range widely in terms of capabilities and features. Alternatively or additionally, the UEs 104 can include a universal integrated circuit card (UICC) with, e.g. a subscriber identity module ("SIM")). The UEs 104 can alternatively or additionally include SIM-less devices (i.e., mobile devices that do not contain a functional SIM), embedded SIM devices (for example, eSIM and/or iSIM devices), roaming mobile devices (i.e., mobile devices operating outside of their home access networks), and/or mobile software applications.

Similar to the nodes, the UEs 104 can include processors 140, one or more transmit circuits (transmitters) 142, one or more receive circuits (receivers) 144, and/or computer-readable media 146. The processors 140 can be configured to execute instructions, which are stored in the computer-readable media 146 or in other computer-readable media accessible to the processors 140. In some implementations, the processor 140 can be a central processing unit (CPU), a graphics processing unit (GPU), or both CPU and GPU, or any other sort of processing unit. The transmitters 142 can include circuitry configured to transmit signals to an external device (e.g., the connection node 102 and/or other UEs), and the receivers 144 can include circuitry configured to receive signals from an external device (e.g., the connection node 102 and/or other UEs). The transmitters 142 and the receivers 144 can be a combined or an overlapping circuit (e.g., transceivers). The computer-readable media 146 can store several modules, such as instructions, data stores, and so forth that are configured to execute on the processors 140. Although not illustrated in FIG. 1, the UEs 104 can also include various other components, for example, a battery, a charging unit, one or more network interfaces, an audio interface, a display, a keypad or keyboard, a GPS receiver and/or other location determination component, and other input and/or output interfaces.

In general, the network 100 can include multiple cells, with each cell including one or more BSs (macro cell), 5G transceivers (including small cell devices), or a combination of both macro and small cells (HetNets), though many other cell types are possible including cells having one or more femtocells, picocells, IEEE 802.11 access points (WiFi APs), and the like. Depending on the configuration and size, the network 100 can represent and serve various regional areas, for example, one or more rooms, one or more blocks, a city, a state, an entire nation, the whole world, etc.

Figure 2:
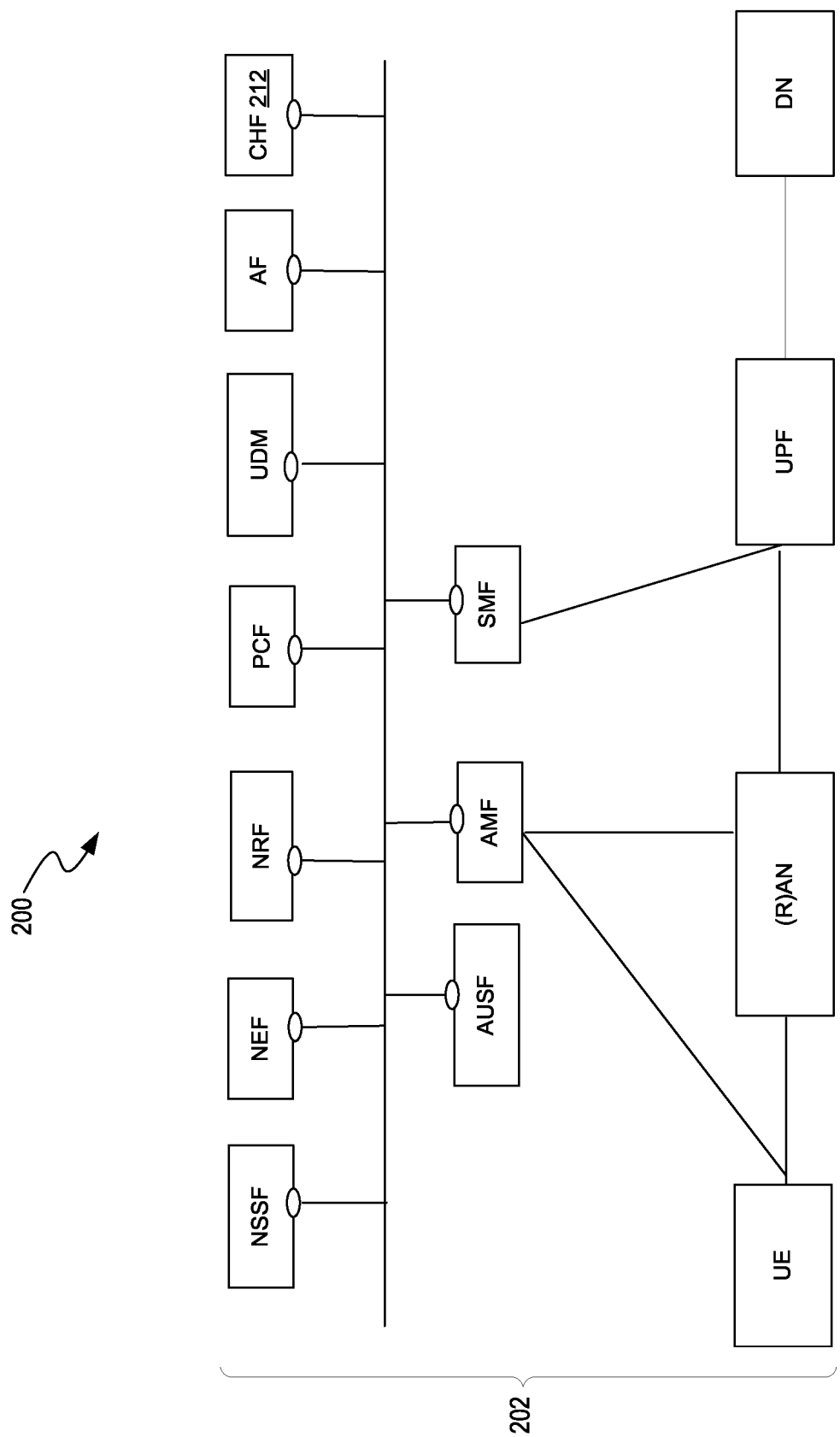
FIG. 2 illustrates an example 5G system architecture in accordance with one or more implementations of the present technology.

FIG. 2 illustrates an example 5G system architecture 200 ("system architecture 200") in accordance with one or more implementations of the present technology. The system architecture 200 can represent the network 100 of FIG. 1 or a portion thereof. The network 100 can include and/or implement various NFs 202 (e.g., a type of virtualized nodes) that implement different functionalities for a service-based architecture. The NFs 202 can include virtualized nodes that are software-based, and in some implementations, can be on cloud computing platforms.

Based on the system architecture 200, the network 100 can view and/or interact with the UEs 104 of FIG. 1 as instances of the NFs 202. Once the UEs 104 connect to the network 100 (via, e.g., the connection node 102), the UEs 104 can interact/communicate with other NFs 202. As illustrated in FIG. 2, for example, the NFs 202 can include a Network Slice Selection Function (NSSF), a Network Exposure Function (NEF), a Policy Control Function (PCF), a Unified Data Management (UDM), an Application Function (AF), an Authentication Server Function (AUSF), an Access and Mobility Management Function (AMF), a Session Management Function (SMF), a (Radio) Access Network ((R)AN), a User Plane Function (UPF), and/or a Data Network (DN). Different types of the NFs 202 can be configured to perform one or more functionalities for communicating data between two or more end points (e.g., to and/or from the UEs 104). For example, the NSSF can be configured to select a set of resources (e.g., Network Slice instances and or the AMF) serving the UE. Also, for example, the AF can interact with the 3GPP Core Network for providing services associated with traffic routing and/or NEF access. In some implementations, the transactional nodes 152 of FIG. 1 can include one or more of the NFs 202.

The NFs 202 can also include one or more Charging Functions (CHFs) configured to provide functionalities associate with access and/or billing. For example, the CHFs can be configured for online and/or offline charging, quota management (e.g., for delivering/granting a specific number of units, such as bytes or seconds), and/or for interacting with other billing systems. Alternatively or additionally, the CHFs can collect, provide, and/or process the CDRs and/or other metadata associated with specific instances of telecommunication transactions/events. The collecting nodes 154 of FIG. 1 can include one or more of the CHFs.

The NFs 202 can further include one or more Network Repository Functions (NRFs). The NRFs can each be configured to support service discovery. For example, the NRFs can be configured to receive discover requests from NF instances and provide information of discovered NF instances to the requesting NF instances.

For the sake of brevity, only a small set of the NFs 202 have been described in detail. However, one of ordinary skill in the art will appreciate that the other functions each perform functionalities for communicating data as described in the 5G communications standards, such as the 3GPP standards regarding 5G system architectures. Also, for brevity, FIG. 1 illustrates a small set of the NFs 202. However, it is understood that the NFs 202 can include other types of functionalities.

Figure 3A:
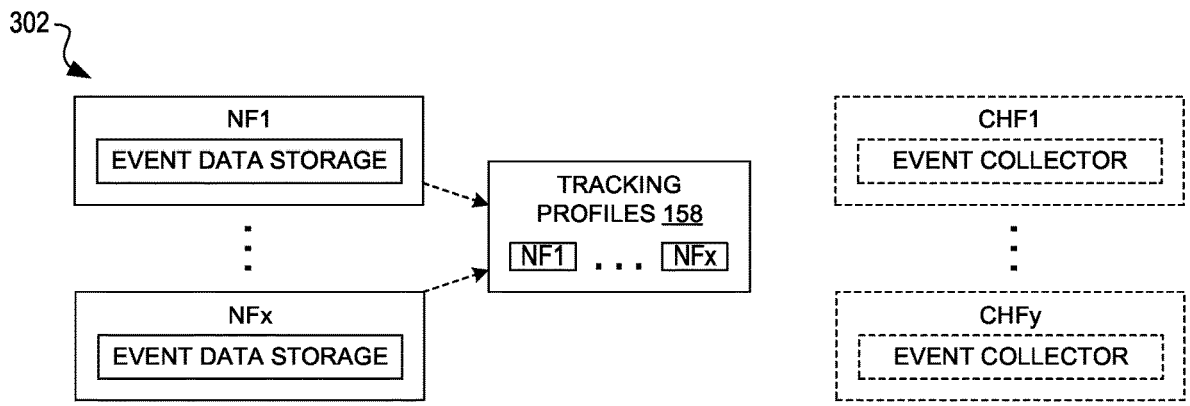
FIGS. 3A-3C illustrate an example sequence for a post-event collection in accordance with one or more implementations of the present technology.
Figure 3B:
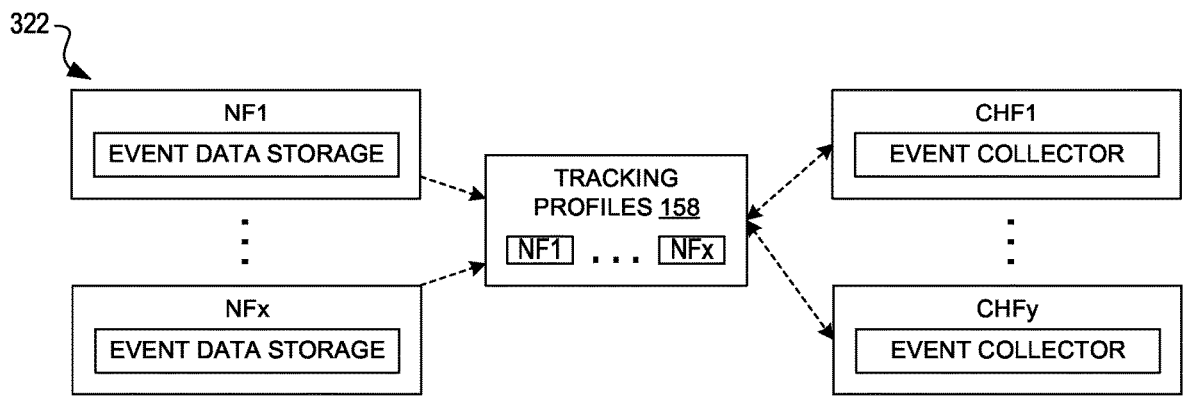
Figure 3C:
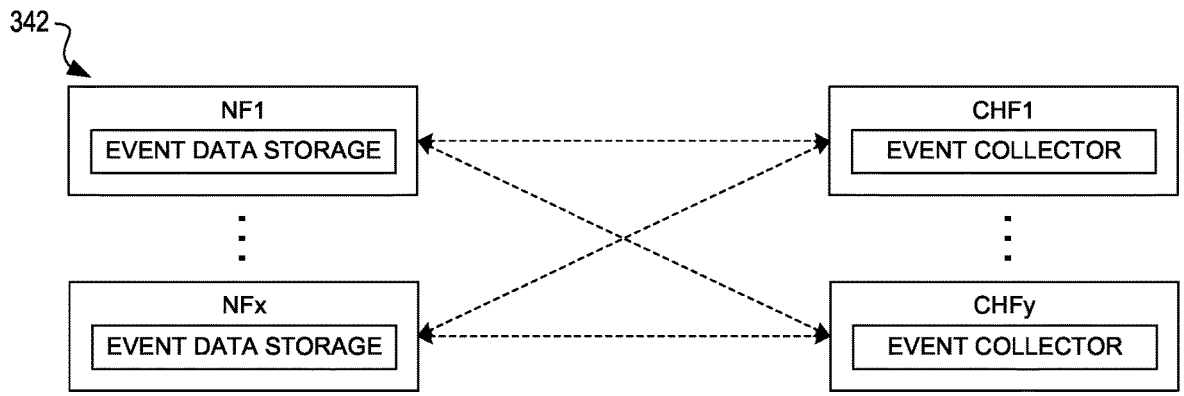

FIGS. 3A-3C illustrate an example sequence for a post-event collection in accordance with one or more implementations of the present technology. FIG. 3A illustrates a first phase 302 where one or more transactional nodes 152 (e.g., the NFs, such as NF1-NFx) fail to contact any collecting nodes 154 of FIG. 1 (e.g., the CHFs) at the start of and/or during charging events. The NFs can detect the failure to connect to a CHF based on identifying a failure to receive a confirmation within a predetermined duration following transmission of a request to connect and/or to verify status, such as due to network instability, failed connection, and/or insufficient processing resources (e.g., at the NFs). The NFs can detect the failure based on receiving an error message and/or an empty set in response to a request to identify CHFs.

The network 100 of FIG. 1 can update the tracking profile 158 when the CHFs are unavailable in real-time to collect and/or process the charging event details (e.g., the CDR). For example, the NFs can be configured to store the CDRs and/or the associated information locally, such as at storage devices associated with the corresponding NFs and/or at remote devices catalogued or tracked by the corresponding NFs. The NFs can further communicate with a centralized database to register for post-event collection. The NFs, the centralized database, other network components, and/or other NFs can update the tracking profiles 158 to include an identifier and/or an address of the NFs that failed to connect to a CHF in real-time. Accordingly, the network 100 can track the NFs that failed to communicate the charging event details with the CHF for subsequent or post-event data collection.

FIG. 3B illustrates a second phase 304 where one or more CHFs (e.g., CHF1-NFy) become available to collect charging events. The CHFs and/or the monitoring nodes 156 of FIG. 1 can be configured to identify the second phase 304 when the load measure 182 of the corresponding CHFs fall below a predetermined/configurable threshold. Accordingly, the available CHFs can access the tracking profiles 158 to identify the NFs thereon. For example, the available CHFs can access the tracking profile 158 based on communicating with the centralized database and/or other network components/NFs according to a predetermined address and/or routine.

The NFs can continue operation in parallel. For example, the new and/or previously registered NFs can continue to register for post-event collection as described above independent of the CHFs accessing the tracking profile 158. The registered charging event can continue as the CHFs become available.

FIG. 3C illustrates a third phase 306 where the available CHFs collect the locally stored event data. For example, the available CHFs can each select and communicate with one or more of the NFs from the tracking profile 158. Accordingly, the locally stored event data can be transferred (via, e.g., a predetermined transfer protocol) from the NFs to the available CHFs. Multiple NFs can communicate with and transfer the locally stored data to one CHF; alternatively or additionally, multiple CHFs can communicate with and obtain the locally stored data from one NF. Also, the NFs can push the locally stored data to the corresponding CHFs, the CHFs can pull the locally stored data from the corresponding NFs, or both.

Figure 4:
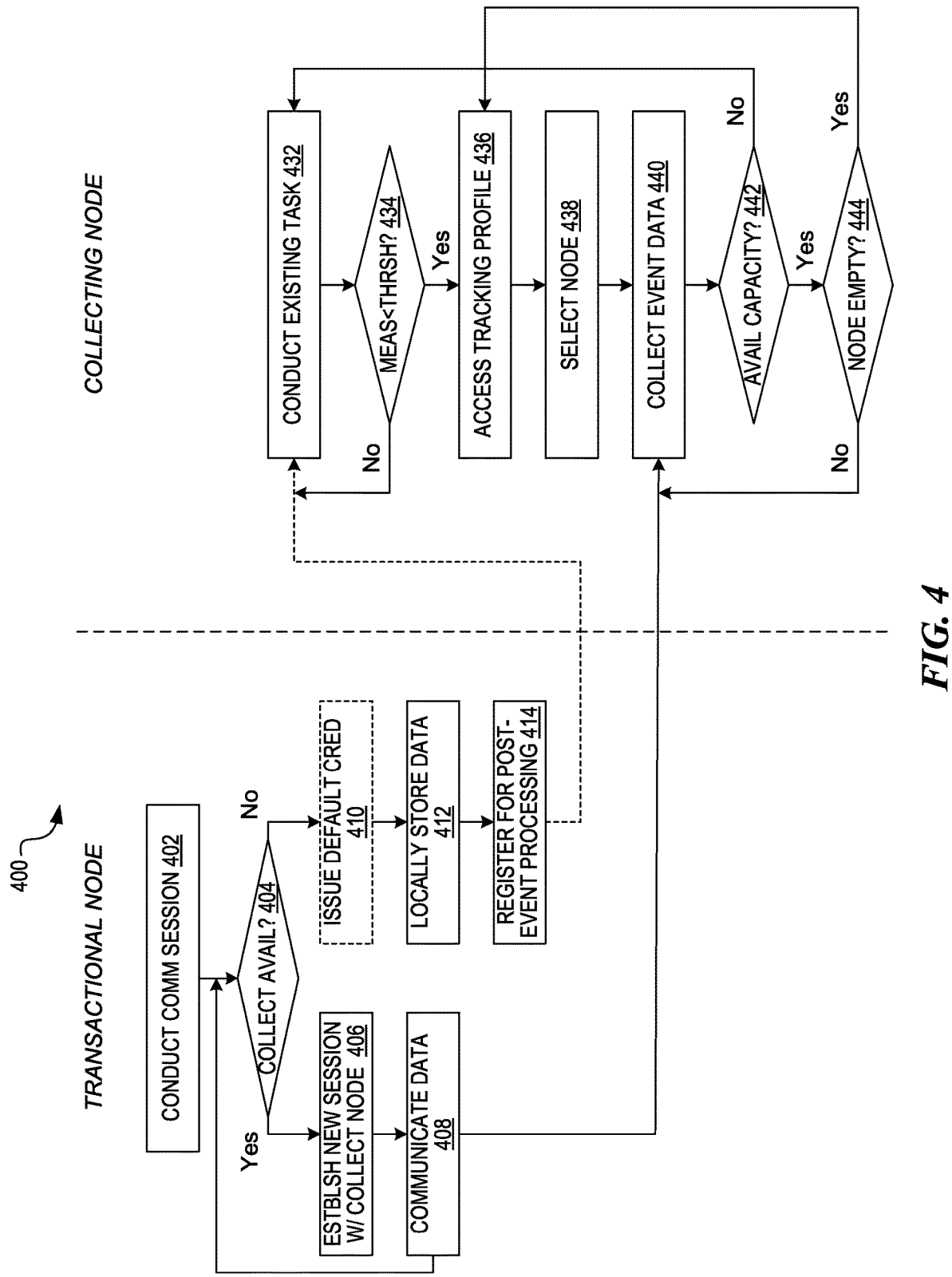
FIG. 4 is a flow diagram illustrating an example method for managing collecting events in accordance with one or more implementations of the present technology.

FIG. 4 is a flow diagram illustrating an example method 400 for managing event data in accordance with one or more implementations of the present technology. The method 400 can be for operating the network 100 of FIG. 1 and/or the system architecture 200 of FIG. 2. The method 400 can be for at least partially implementing the example phases 302-306 illustrated in FIGS. 3A-3C, and dynamically register for and implement post-event data collection for the network 100.

At block 402, the network 100 can conduct a communication session (e.g., a charging event) via the transactional nodes 152 of FIG. 1 (e.g., the NFs, such as a UE and a SMF). For example, a UE associated with a post-payment plan can access a website, communicate message data (e.g., send/receive text and/or image), and/or communicate voice data (e.g., for voice communication). Accordingly, the transactional nodes 152 can initiate and/or conduct the communication session according to one or more predetermined routines and/or protocols.

At decision block 404, the network 100 can determine whether one or more of the collecting nodes 154 of FIG. 1 (e.g., the CHFs) are available. For example, the NFs can communicate with one or more other nodes (e.g., the collecting nodes 154, the NRFs, and/or the monitoring nodes 156 of FIG. 1) to determine whether one or more of the collecting nodes 154 are available.

When one or more of the collecting nodes 154 are available, such as illustrated at block 406, the transactional nodes 152 can establish a session with one or more of the available collecting nodes 154. The transactional nodes 152 can establish the session according to one or more predetermined processes or protocols. At block 408, the transactional nodes 152 and the corresponding collecting nodes 154 can communicate details regarding the charging event (e.g., the communication session) in real-time. Accordingly, as illustrated at block 440, the transactional nodes 152 and the collecting nodes 154 can communicate data associated with the charging event (e.g., the CDRs and/or the associated data). The transactional nodes 152 can send the details of the charging event (e.g., the CDRs), and the collecting nodes 154 can receive the sent details. For example, the transactional nodes 152 (e.g., the NFs) can push the CDRs and/or the associated details to the corresponding collecting nodes 154. Alternatively, the collecting nodes 154 can pull the CDRs and/or the associated details from the corresponding NFs.

The transactional nodes 152 and/or the collecting nodes 154 can continually or periodically check/verify whether the collecting nodes 154 are still available as illustrated by the feedback loop to block 404. When the collecting nodes 154 remain available, the network 100 can bypass block 406 and can continue to communicate data. When the collecting nodes 154 are initially unavailable or become unavailable during the real-time session, such as illustrated at blocks 410 and/or 412, the network 100 can initiate operations for post-event data collection. As illustrated at block 410, the transactional nodes 152 (e.g., the NFs) can grant default credits for the communication session. For example, the NFs can issue default credits to enable the communication session since the CHFs are unavailable to issue the communication-related credits. When the collecting nodes 154 become unavailable during transfer, the network 100 can bypass the operations corresponding to block 410.

At block 412, the transactional nodes 152 can locally store the charging event details (e.g., the local session data 172 of FIG. 1, such as the CDR and/or the associated data). For example, the transactional nodes 152 can store the local session data 172 at a device implementing and/or associated with the NFs. The transactional nodes 152 can locally store the local session data 172 after a configurable/predetermined number of units have been consumed during the session. At block 414, the network 100 can register the transactional nodes 152 for post-event processing. For example, the NFs can register itself on the tracking profiles 158 based on communicating with the centralized database, the other network components/NFs, and/or the CHFs (e.g., for static implementations of the tracking profiles 158).

Subsequently or in parallel, the collecting nodes 154 (e.g., the CHFs) can conduct or implement existing task(s) as illustrated at block 432. In other words, the CHFs can execute the ongoing and/or the scheduled functions. At decision block 434, the network 100 (e.g., the collecting nodes 154 and/or the monitoring nodes 156 of FIG. 1) can determine the load measures 182 of FIG. 1 for the collecting nodes 154 for comparison with a configurable threshold. The configurable threshold can be predetermined and/or dynamically updated based on operator input, real-time network conditions, and/or projected network conditions. The configurable threshold can be represented as a percentage of full capacity (e.g., less than 80%, 50%, or 40% of full capacity). When the load measure 182 is not below the threshold, the network 100 continues to conduct or implement the existing task(s) as illustrated by the feedback loop to block 432.

When the load measure 182 is below the threshold, the network 100 can utilize the corresponding collecting nodes 154 to collect the post-event data locally stored in the NFs. At block 436, the corresponding collecting nodes 154 can access the tracking profiles 158 to determine the listing of the transactional nodes 152 having the local session data 172. For example, the available CHFs can access the internally stored list to determine the listing of the transactional nodes 152. Alternatively or additionally, the available CHFs can communicate with the centralized database and/or other network functions/NFs according to a predetermined process and/or protocol to access the tracking profiles 158. Accordingly, the available CHFs can identify the NFs having the local session data 172 that need to be collected post event.

At block 438, the network 100 can select one or more of the transactional nodes 152 as collection targets. The network component/node managing the tracking profiles 158 (e.g., the centralized database and/or other network components/NFs) can sort and/or select and assign the transactional nodes 152 to the collecting nodes 154. As examples, the selection/sort can be based on the number of available events (e.g., most to least or least to most), based on the identifier/address (e.g., alphabetic or numeric ordering), random, and/or order of registration (e.g., first-come first-served/listed). The collecting nodes 154 can select one or more of the transactional nodes 152 listed in the tracking profiles 158 according to a predetermined pattern, such as from the top or the bottom of the list or at random. The collecting nodes 154 can be configured to select no more than one transactional node 152 each time the tracking profiles 158 is accessed. The transactional nodes 152 can also record a number of transactions and/or a size of the local session data 172 in the tracking profiles 158, and the collecting nodes 154 can select a number of the transactional nodes 152 according to the load measure 182 and/or the recorded number/size.

The network 100 can track the selections (e.g., the assignments between the transactional nodes 152 and the collecting nodes 154), thereby eliminating collection of duplicate data. For example, when selections are made, the network 100 can update the tracking profiles 158 via the collection registration mechanism 194 of FIG. 1. The collecting nodes 154, other network components/functions, and/or the centralized database can generate status indicators for the node identifiers 192 of FIG. 1 when the corresponding NFs have been selected. The collecting nodes 154, other network components/functions, and/or the centralized database can remove the node identifiers 192 from the tracking profiles 158 based on the corresponding selection. The collecting nodes 154, other network components/functions, and/or the centralized database can track the assignments based on storing and associating identifiers of the selecting CHFs to the corresponding node identifiers 192.

At block 440, the collecting nodes 154 can collect the post-event data (e.g., the local session data 172) from the selected transactional nodes 152. The collection process can be similar to the real-time collection process described above. The collecting nodes 154 and the transactional nodes 152 can communicate with each other (e.g., as communication end-points) to communicate the local session data 172. The collecting nodes 154 can obtain the local session data 172 based on a predetermined process, such as an SSH File Transfer Protocol (SFTP), an Application Programming Interface (API), and/or other communication mechanisms. The collecting nodes 154 can obtain the local session data 172 based on one or more predetermined authentication/authorization mechanisms, such as access control lists, log-ins, Public Key Infrastructure (PKI) certificates, SSH keys, and/or access control mechanisms.

The network 100 can further control communication of the local session data 172. For example, the collecting nodes 154 can obtain the local session data 172 associated with individual session/event. The collecting nodes 154 can obtain a file that accumulates data associated with multiple sessions/events. The collecting nodes 154 can communicate with the transactional nodes 152 to identify a component (e.g., external or catalogued storage device) or an address used to store or accumulate the local session data 172 for the corresponding transactional nodes 152.

The multiple collecting nodes 154 can obtain the local session data 172 for different sessions from one transactional node 152. To avoid duplicate processing of the same event by multiple collecting nodes 154, the network 100 (e.g., the transactional nodes 152) can use the access registration mechanism 174 of FIG. 1 to manage the access. For example, the NFs and/or the CHFs can be configured to assign the local session data 172 for particular sessions to one of the transactional nodes 152, such as upon engagement and/or upon authorizing communication. The NFs and/or the CHFs can move the assigned local session data 172 to another directory and/or mark the assigned local session data 172 to avoid duplicate processing. Further, the NFs and/or the CHFs can delete the local session data 172 from the NFs after successful processing/transfer thereof.

At block 442, the network 100 (e.g., the collecting nodes 154 and/or the monitoring nodes 156) can check the current capacity for further processing the events. For example, the CHFs can redetermine or track the load measure 182 during and/or after obtaining/processing the local session data 172. The CHFs can determine whether further capacity exists for post-event collection based on comparing the load measure 182 to a configurable threshold, which can be the same as or different than the threshold for initiating the post-event collection (block 434). When the network 100 determines that the collecting nodes 154 no longer have available capacity, the collecting nodes 154 can stop collecting/processing data for further events. Accordingly, the collecting nodes 154 can continue executing existing tasks (block 432) as represented by the feedback loop.

When the network 100 determines that the collecting nodes 154 have available capacity, the network 100 can further determine whether the transactional nodes 152 are empty of the local session data 172. When empty (e.g., when all of the existing local session data 172 have been transferred from the engaged transactional node(s)), the collecting nodes 154 can re-access the tracking profile 158 (block 436) to engage one or more new transactional nodes 152 as represented by the feedback loop. Accordingly, the collecting nodes 154 can repeat the above-described process to further collect post-event data from different node(s). When the engaged node(s) are not empty, the collecting nodes 154 can continue to collect the event data (block 440) as represented by the feedback loop.

Figure 5:
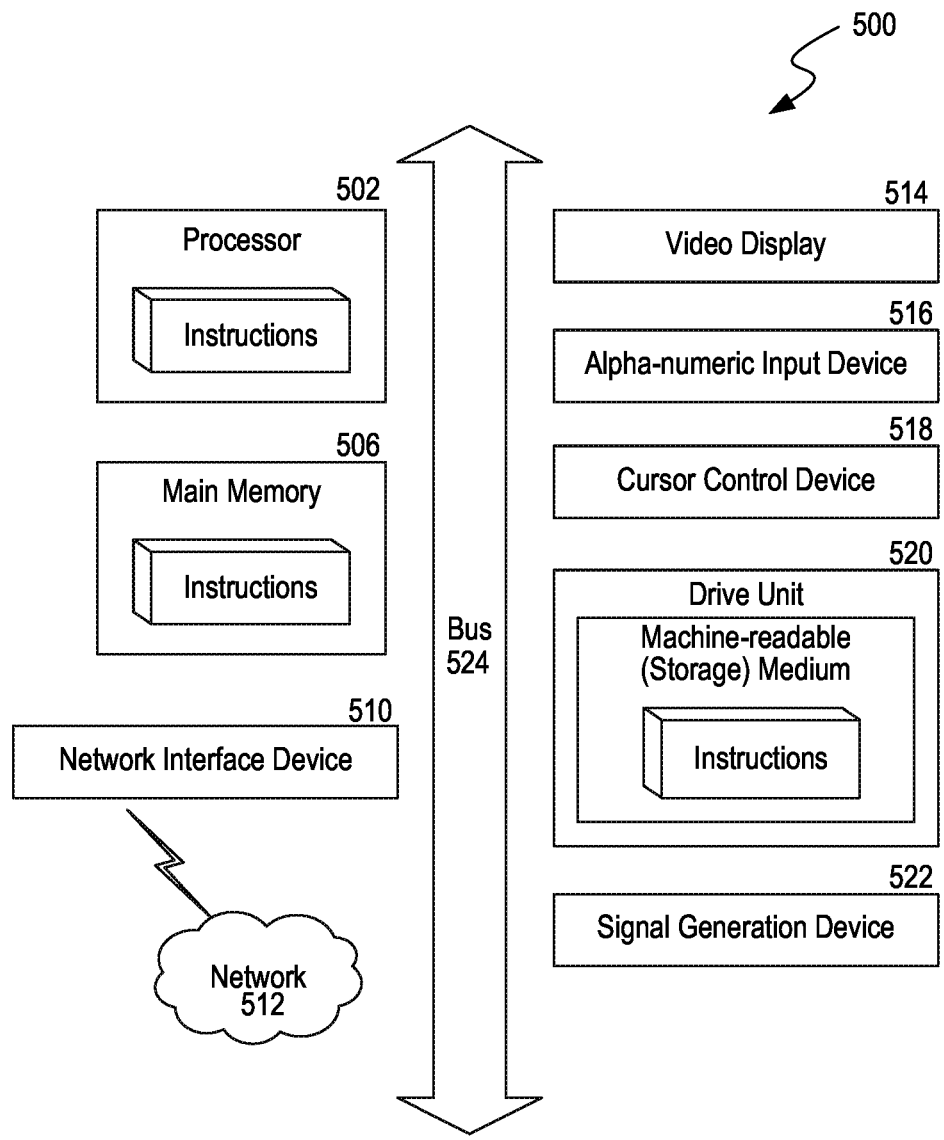
FIG. 5 is a diagrammatic representation of a machine in the example form of a computer system within which a set of instructions, for causing the machine to perform any one or more of the methodologies discussed herein, can be executed.

FIG. 5 is a diagrammatic representation of a machine in the example form of a computer system or machine 500 within which a set of instructions, when executed, can cause the machine to perform any one or more of the processes (e.g., method 400) described above. The machine 500 operates as a standalone device, or, alternatively, the machine 500 can be connected (e.g., networked) to other machines. In a networked deployment, the machine 500 may operate in the capacity of a server or a client user machine in a client-server network environment, or as a peer machine in a peer-to-peer (or distributed) network environment. The machine may include a user device, such as UEs 104 discussed above, the gNB, and/or other network components (e.g., cloud computing devices and/or servers). In some implementations, the machine 500 includes 5G servers. While a single machine is illustrated, the machine 500 can include any collection of machines that individually or jointly execute instructions to perform any of the methods described above.

The machine 500 may include a processor 502, a main memory 506 and a bus 524. The bus 524 can include a subsystem for transferring data between the components of the machine 500, including transferring data between the main memory 506 and the processor 502. The bus 524 can represent one or more separate physical buses, point to point connections, or both, connected by appropriate bridges, adapters, or controllers. The machine 500 can also include a display device 514, one or more input devices 516, a cursor control device 518 (for example, a mouse), a drive unit 520, a signal generation device or output device 522 (for example, a speaker, a remote control, etc.) and a network interface device 510, among others.

The processor(s) 502 can control the overall operation of the machine 500. The processor(s) 502 can execute computer programs or firmware stored in memory (for example, 506, 520). The processor(s) 502 can include one or more programmable general-purpose or special-purpose microprocessors, digital signal processors ("DSPs"), programmable controllers, application specific integrated circuits ("ASICs"), programmable logic devices ("PLDs"), trusted platform modules ("TPMs"), or the like, or a combination thereof.

The main memory 506 represents any form of memory ("RAM"), read-only memory ("ROM"), flash memory, or the like, or a combination of such devices connected to the bus 524. The drive unit 520 can include a machine-readable medium or machine-readable storage medium (such as computer-readable media 126) that stores, encodes or carries one or more sets of instructions for execution by the machine 500 to perform any or all of the methods described above. It should be noted that the term "machine-readable medium" and "machine-readable storage medium" can include a single medium or multiple media (for example, a centralized or distributed database, and/or associated caches and servers) that store the one or more sets of instructions embodying any or all of the methods described above.

In general, the routines executed to implement the present technology can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

The network interface device 510 allows the machine 500 to mediate data in various networks with one or more entities that are external to the machine, through any known and/or convenient communications standards and protocols supported by the machine 500 and the external entities. Example protocols supported by the machine 500 include, but are not limited to: IP protocols for the application layer, transport layer protocols, Internet layer protocols, link layer protocols, LTE protocols, 3G/4G/5G protocols, etc. The network interface device 510 can include one or more of a network adaptor card, a wireless network interface card, a router, an access point, a wireless router, a switch, a multi-layer switch, a protocol converter, a gateway, a bridge, a bridge router, a hub, a digital media receiver, a repeater, or other interfaces for supporting the various protocols. Although the present disclosure describes the components and functions implemented in the present technology with reference to particular standards and protocols that represent examples of the state of the art, the disclosure is not limited to such standards and protocols, and includes functional equivalents that can supersede the current state of the art.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

I claim:

1. A non-transitory computer-readable medium storing instructions that, when executed by a processor in a computing system, cause the computing system to execute instructions comprising:
storing session data proximate to a first network node based on detection of a negative network event between at least one charging function (CHF) and the first network node,
wherein the at least one CHF and the first network node are coupled via a network, and
wherein the stored session data represents charging information regarding one or more current or recent communication sessions of the network;
adding an identifier of the first network node to a tracking profile,
wherein the identifier represents one or more network nodes that were unable to report the information regarding the one or more communication sessions;
accessing the tracking profile at the CHF based on comparison of a network activity with a threshold; and,
based on the accessing, modifying the tracking profile based on the identifier of the one of the first network nodes that provided the session data.

2. The non-transitory computer-readable medium of claim 1, wherein the tracking profile is maintained at a database accessible to components and/or functions in the network, and wherein the network is a 5G telecommunications network.

3. The non-transitory computer-readable medium of claim 1, wherein the tracking profile is maintained at a component and/or a network function within the network, and wherein the network is a 5G telecommunications network.

4. The non-transitory computer-readable medium of claim 1, wherein the session data is received at the CHF, and includes pushing the session data using the first network node to the CHF.

5. The non-transitory computer-readable medium of claim 1, further comprising receiving the session data at the CHF and pulling the session data from the first network node using the CHF.

6. The non-transitory computer-readable medium of claim 1, wherein:
the CHF is a first CHF; and
further comprising:
receiving the session data at a second CHF according to the accessed tracking profile.

7. The non-transitory computer-readable medium of claim 1, wherein:
the CHF is a first CHF;
the session data is received at the first CHF, which is a first data representative of a first portion of the one or more communication sessions; and
further comprising:
receiving a second data from the first network node at a second CHF, wherein the second data represents a second portion of the one or more communication sessions, wherein the first portion and the second portion are mutually exclusive.

8. A system comprising:
one or more hardware processors;
at least one hardware data storage, coupled to the one or more processors, and storing instructions, which when executed by the one or more processors, perform operations to:
store session data proximate to a first network node based on detection of a negative network event between at least one telecommunications charging operation and the first network node,
wherein the stored session data represents charging information regarding one or more current or recent communication sessions;
update a tracking profile to reflect that at least the first network node was unable to report the information regarding the one or more communication sessions, wherein the tracking profile includes an identifier for the first network node;
process the tracking profile based on comparison of a network activity with a threshold; and,
based on the processing, modify the tracking profile relative to the identifier of the first network node that provided the session data.

9. The system of claim 8, wherein the tracking profile is maintained at a database accessible to components and/or functions in the 5G telecommunications network.

10. The system of claim 8, wherein the tracking profile is maintained at a component and/or a network function within the 5G telecommunications network.

11. The system of claim 8, wherein the session data is received based on pushing the session data using the first network node to the telecommunications charging operation.

12. The system of claim 8, wherein the session data is received at the telecommunications charging operation based on pulling the session data from the first network node via the telecommunications charging operation.

13. The system of claim 8, wherein:
the telecommunications charging operation is a first CHF; and
the data storage includes instructions executable by the one or more processors to receive the session data at a second CHF according to the tracking profile.

14. The system of claim 8, wherein:
the telecommunications charging operation is a first CHF;
the session data is received at the first CHF and is a first data representative of a first portion of the one or more communication sessions; and
the data storage includes instructions executable by the one or more processors to a second data from the first network node at a second CHF, wherein the second data represents a second portion of the one or more communication sessions, wherein the first portion and the second portion are mutually exclusive.

15. A method comprising:
storing session data proximate to a first network node based on detection of a negative network event between at least one telecommunications charging operation and the first network node,
wherein the stored session data represents charging information regarding one or more current or recent communication sessions;
updating a tracking profile to reflect that at least the first network node was unable to report the information regarding the one or more communication sessions, wherein the tracking profile includes an identifier for the first network node;
processing the tracking profile based on comparison of a network activity with a threshold; and, based on the processing, modifying the tracking profile relative to the identifier of the first network node that provided the session data.

16. The method of claim 15, wherein the tracking profile is maintained at a database accessible to components and/or functions in the 5G telecommunications network.

17. The method of claim 15, wherein the tracking profile is maintained at a component and/or a network function within the 5G telecommunications network.

18. The method of claim 15, further comprising receiving session data at a network charging function, including pushing the session data using the first network node to the network charging function.

19. The method of claim 15, wherein receiving the session data at a network charging function, including pulling the session data from the first network node using the network charging function.

20. The method of claim 15, wherein:
a first network charging function receives the session data; and
further comprising:
receiving the session data at a second the session data according to the tracking profile.

* * * * *